(12) United States Patent
Hans

(10) Patent No.: US 11,698,131 B2
(45) Date of Patent: Jul. 11, 2023

(54) MANUAL TRANSMISSION AND ACTUATING DEVICE FOR A MANUAL TRANSMISSION

(71) Applicant: Schaeffler Technologies AG & Co. KG, Herzogenaurach (DE)

(72) Inventor: Dominik Hans, Muggensturm (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 19 days.

(21) Appl. No.: 17/208,305

(22) Filed: Mar. 22, 2021

(65) Prior Publication Data

US 2021/0310557 A1  Oct. 7, 2021

(30) Foreign Application Priority Data

Apr. 1, 2020 (DE) .................... 10 2020 109 030.7

(51) Int. Cl.
*F16H 61/28* (2006.01)
*F16H 63/20* (2006.01)

(52) U.S. Cl.
CPC ............. *F16H 61/28* (2013.01); *F16H 63/20* (2013.01); *F16H 2061/283* (2013.01)

(58) Field of Classification Search
CPC ..... F16H 61/28; F16H 2063/202; F16H 63/20
See application file for complete search history.

(56) References Cited

U.S. PATENT DOCUMENTS 1,928,782 A  10/1933 Church
4,391,158 A  7/1983 Malott et al.
2004/0112158 A1* 6/2004 Norum .................. F16H 63/206
                                                        903/905
2006/0005648 A1* 1/2006 Ehrlich .................... F16H 63/20
                                                        74/335
2006/0005654 A1* 1/2006 Ehrlich ................... F16H 63/22
                                                        74/473.1
2006/0150761 A1* 7/2006 Beer ..................... F16H 63/206
                                                        74/473.1
2007/0089556 A1* 4/2007 Kim ........................ F16H 63/20
                                                        74/473.3

(Continued)

FOREIGN PATENT DOCUMENTS

AT    520187 A4   2/2019
DE    3202590 A1  11/1982

(Continued)

*Primary Examiner* — Terence Boes

(57) ABSTRACT

An actuating device for actuating gear shifting units of a manual transmission has deflectable transmission elements assigned to a respective gear shift unit for changing the gear ratio, a movable actuating element, and gear shift elements assigned thereto. The gear shift elements are movable together with the actuating element and are arranged in two gear shift groups. Dependent on a selecting position of the actuating element, the gear shift elements are coupled with coupling means for deflecting the transmission elements by means of a shifting movement. The shifting movement is independent of the selecting movement. The selecting position can be changed in selecting steps that are delimited by a selecting step length. At least one first gear shift element has an interconnected first gear shift length which is greater than the selecting step length.

19 Claims, 5 Drawing Sheets

(56) References Cited

U.S. PATENT DOCUMENTS

2008/0305928 A1* 12/2008 Shintani .................. F16H 63/20
477/115
2015/0184743 A1* 7/2015 Eto ......................... F16H 59/48
701/55
2021/0148462 A1* 5/2021 Pregnolato ............ F16H 63/304

FOREIGN PATENT DOCUMENTS

| DE | 102005031016 A1 | 2/2006 |
|----|-----------------|--------|
| DE | 102005053867 A1 | 6/2006 |
| DE | 102006029166 A1 | 1/2007 |
| DE | 102006054900 A1 | 6/2007 |
| DE | 102015210541 A1 | 12/2016 |
| DE | 102019130882 B3 | 10/2020 |
| DE | 102019130884 A1 | 5/2021 |
| EP | 1333200 A2 | 8/2003 |

* cited by examiner

|       | A1 | A2 | B | C | X |
|-------|----|----|---|---|---|
| Gear 1 | O | X | X | O | O |
| Gear 2 | X | O | X | O | O |
| Gear 3 | O | X | O | X | O |
| Gear 4 | O | X | O | O | X |
| Gear 5 | X | O | O | X | O |
| Gear 6 | X | O | O | O | X |
| 1-2 | ↓ | ↑ |   |   |   |
| 2-3 | ↑ |   | ↑ | ↓ |   |
|     |   | ↓ |   |   |   |
| 3-4 |   |   |   | ↑ | ↓ |
| 4-5 |   | ↑ |   | ↓ | ↑ |
|     | ↓ |   |   |   |   |
| 5-6 |   |   |   | ↑ | ↓ |
| 6-5 |   |   |   | ↓ | ↑ |
| 5-4 | ↑ |   |   | ↑ | ↓ |
|     |   | ↓ |   |   |   |
| 4-3 |   |   |   | ↓ | ↑ |
| 3-2 |   | ↑ | ↓ | ↑ |   |
|     | ↓ |   |   |   |   |
| 2-1 | ↑ | ↓ |   |   |   |

FIG. 5

MANUAL TRANSMISSION AND ACTUATING DEVICE FOR A MANUAL TRANSMISSION

CROSS-REFERENCE TO RELATED APPLICATIONS

This application claims priority to DE 10 2020 109 030.7 filed Apr. 1, 2020, the entire disclosure of which is incorporated by reference herein.

TECHNICAL FIELD

The disclosure relates to an actuating device for actuating a manual transmission and to a manual transmission actuated by such a device.

BACKGROUND

An actuating device is known for example from DE 10 2005 031 016 A1. It describes an actuating device for actuating a manual transmission, which has deflectable transmission elements that shift gear ratios of the manual transmission. The transmission elements can be deflected by a shifting movement of gear shift elements and each act on an assigned idler gear via a shift fork and a shift sleeve in order to shift the gear ratio. The gear shift elements can be designed as gear shift fingers and comprise, on the one hand, engagement fingers for engaging the gear ratio by connecting the idler gear to the assigned gear shaft in a rotationally fixed manner, and on the other hand, disengagement fingers for disengaging the gear ratio by shifting the idler gear so that it can rotate with respect to the assigned gear shaft. The gear shift elements can be moved by a selecting movement with respect to the transmission elements, even when the gear ratio is set. As a result, the next gear can be preselected when a gear is engaged and, when changing gear, the preselected gear can be engaged and the previous gear disengaged at the same time.

If the manual transmission has a winding gear, at least one gear ratio assigned to a direct gear and a further gear ratio assigned to another direct gear must be engaged when the winding gear is set. In the case of the winding gear to be set, for example, one gear ratio is engaged without disengaging the other gear ratio. In contrast, when the direct gear is to be set, one gear ratio is engaged and the other gear ratio is disengaged.

SUMMARY

It is desirable to operate a manual transmission in a more flexible and cost-effective manner. The manual transmission should be constructed more cost-effectively, more compactly and be lighter. An actuating device for actuating a manual transmission permits more versatile shifting of the gear ratios. The gear ratios can be selected differently from a sequential shifting.

The manual transmission can be a vehicle transmission. The manual transmission can transmit a drive torque to drive the vehicle. The manual transmission can have at least one winding gear and one direct gear. The manual transmission can be an automated transmission.

The gear shift unit can be a gear shift fork. The gear shift unit can be connected to at least one switching sleeve, in particular a sliding sleeve. The gear shift unit can be rotated relative to the switching sleeve. The gear shift unit can be assigned to at least one idler gear, in particular two idler gears. The gear ratios can be switched by a gear shift unit in that an actuation of the gear shift unit changes a rotational engagement of the assigned idler gear. For example, the idler gear can be coupled non-rotatably to a transmission shaft receiving it and thus engage the gear ratio and/or shift it to be rotatable with respect to the transmission shaft and thus disengage the gear ratio.

The actuating device can have an actuator device. The actuator device can be connected to the actuating element. The actuator device can move the actuating element. The actuator device can trigger the shifting movement and/or selecting movement. The actuator device can have at least one actuator element, in particular two actuator elements. The actuator element can have an electric motor.

The actuating element can be an actuating shaft. The actuating element can be rotatable and axially displaceable. The actuating element can axially reach through at least one transmission element.

The gear shift elements can be firmly connected to the actuating element, in particular designed in one piece. The individual gear shift element can be a gear shift finger. At least one gear shift element, in particular the first gear shift element, can cause at least one gear ratio to be engaged and a further gear shift element to disengage the gear ratio.

The gear shift length can be an integer multiple of the selecting step length. The gear shift length of at least one further gear shift element can be less than or equal to the selecting step length.

The first gear shift element can engage a gear ratio assigned to a winding path.

The coupling means can be actuating contours on the transmission element. The actuating contours can be implemented at least in sections within the transmission element.

The selecting movement can be an axial movement of the actuating element. The shifting movement can be a rotary movement of the actuating element. The selecting movement can take place with at least one gear ratio engaged and retained.

In an embodiment, the first gear shift element is set up for engaging and/or disengaging at least one gear ratio. The first gear shift element can be set up for engaging at least one gear ratio. A second gear shift element, which in one direction along the selecting movement has an interconnected second shifting length which effects the shifting coupling with one of the transmission elements and which is greater than the length of the selecting step, can be set up to disengage at least one gear ratio.

In an embodiment, the first gear shift length is at least twice as large as the selecting step length. The first gear shift length can be at least three times as large as the selecting step length.

In an embodiment, the first gear shift element has a shifting coupling with the same transmission element in a first selecting position and in an adjacent second selecting position. As a result, the transmission element can act in a more versatile manner in conjunction with at least one further transmission element.

In an embodiment, a shifting movement in the first and second selecting position causes a deflection of the transmission element. The deflection of the transmission element can engage an assigned gear ratio.

In a further embodiment, the shifting movement deflects a further transmission element in the first selecting position and not actuated in the second selecting position. The deflection of the further transmission element can disengage an assigned gear ratio.

In an embodiment, at least two transmission elements have a first distance in one direction along the selecting movement which is greater than or equal to the length of the selecting step. The first distance can also be zero or smaller than the selecting step length. The first distance can be greater than or equal to twice, in particular three times, preferably four times the length of the selecting step. The first distance can be an integral multiple of the selecting step length.

In an embodiment, at least two further transmission elements have a second distance in one direction along the selecting movement, which is different from the first distance. The second distance can also be the same as the first distance. The second distance can be greater than or equal to the selecting step length. The second distance can also be zero or less than the length of the selecting step. The second distance can be greater than or equal to twice, in particular three times, preferably four times the length of the selecting step. The second distance can be an integral multiple of the selecting step length.

In an embodiment, at least two gear shift elements are arranged in a gear shift group, each for engaging at least one gear ratio. The gear shift group can have at least one gear shift element for disengaging at least one gear ratio.

BRIEF DESCRIPTION OF THE DRAWINGS

The manual transmission and actuating device are described in detail below with reference to the drawings. Specifically:

FIG. 5: shows a gear shift table of a manual transmission.

DETAILED DESCRIPTION

Figure 1:
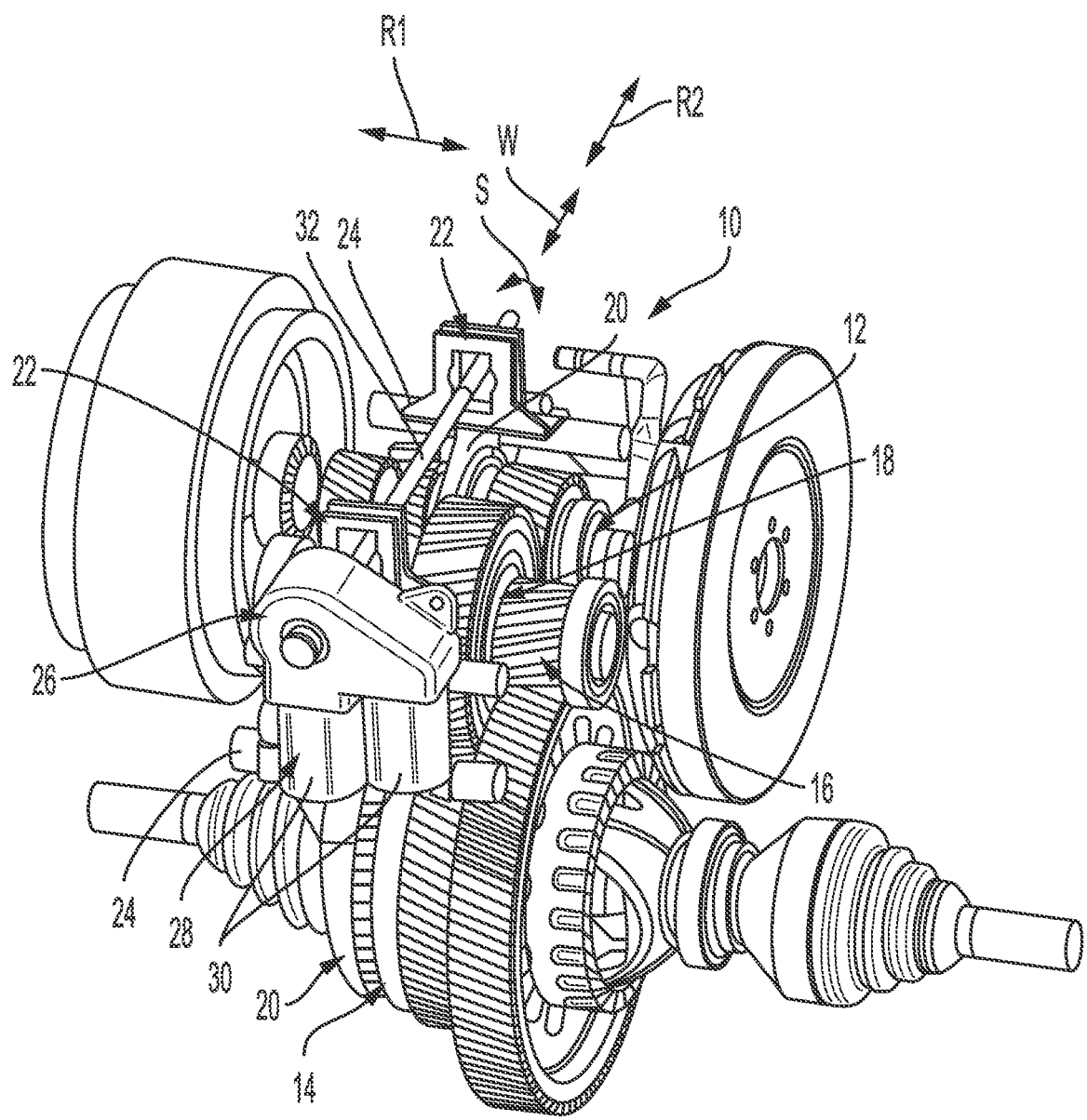
FIG. 1: shows a three-dimensional view of a manual transmission.

FIG. 1 shows a three-dimensional view of a manual transmission 10. The manual transmission 10 is a vehicle transmission and can bring about a torque transmission between a drive element, for example an internal combustion engine and/or an electric motor, and an output element, for example a vehicle wheel. The manual transmission 10 has a drive shaft 12 for connection to the drive element and an output shaft 14 for connection to a vehicle wheel.

A first intermediate shaft 16 and a second intermediate shaft, each arranged axially parallel, are effective between the axially parallel drive shaft 12 and the output shaft 14. The manual transmission 10 comprises different gear ratios formed by gearwheels 18 through which a total of six gears can be shifted. The gearwheels 18 are arranged in a first axial direction R1, i.e., a direction running parallel to the drive shaft 12 and the output shaft 14, in three gearwheel planes. In one gearwheel level, the gearwheels 18 can be designed as fixed gears and in the two remaining gearwheel levels as idler gears that are integrated or decoupled for setting the gear ratios, corresponding to a respective engaged or disengaged gear ratio.

In each gear of the manual transmission 10, a total of at least two idler gears are integrated and thus non-rotatably connected to the shaft receiving the respective idler gear. The manual transmission 10 can have direct gears and winding gears. The idler gears are switched by respectively assigned gear shift units 20, which are designed as respective gear shift forks, by interposing gear shift sleeves. Each gear shift unit 20 is firmly connected to a transmission element 22 and can be axially displaced together with it along the first axial direction R1. Each gear shift unit 20 is received on a guide rod 24 so as to be axially displaceable along the first axial direction R1.

An actuating device 26 is arranged for actuating the individual gear shift units 20. The actuating device 26 comprises an actuator device 28 which is flange-mounted on a transmission housing and has a first and a second actuator element 30. Furthermore, the actuator device 28 is connected to a movable actuating element 32. The actuating element 32 is designed as an actuating shaft and is displaceable in a second axial direction R2 perpendicular to the first axial direction R1 and rotatable about its longitudinal axis. The movement along the second axial direction R2 causes a selecting movement W to change a selecting position of the actuating element 32 and the rotary movement a shifting movement S of the actuation element 32 to deflect the gear shift units 20 via the transmission elements 22.

The selecting movement W can be triggered by one of the actuator elements 30 and the shifting movement S by the other actuator element 30. An actuator element 30 can also enable both the selecting movement W and the shifting movement S.

The shifting movement S is aligned perpendicular to the selecting movement W. The selecting position can be changed in selecting steps that are delimited from one another by a selecting step length. The selecting step length corresponds to a predetermined distance along the second axial direction R2.

The actuating element 32 is firmly connected to multiple gear shift elements 34 arranged in a row along the second axial direction R2. The gear shift elements 34 are arranged in a first gear shift group G1 and in a second gear shift group G2 arranged in the second axial direction R2 at a distance from the first gear shift group G1. The gear shift elements 34 can be coupled to the transmission elements 22 with the formation of a shifting coupling as a function of a selecting position of the actuating element 32 that is variable as a result of the selecting movement W.

In the present shifting coupling between the respective gear shift element 34 and the transmission element 22, a shifting movement S of the actuating element 32, here a rotary movement of the actuating element 32, can move the transmission elements 22 along the first axial direction R1 and thus move the gear shift units 20 depending on the selecting position of the actuating element 32 in order to integrate or decouple the idler gears, i.e., to engage or disengage the corresponding gear ratio.

Figure 2:
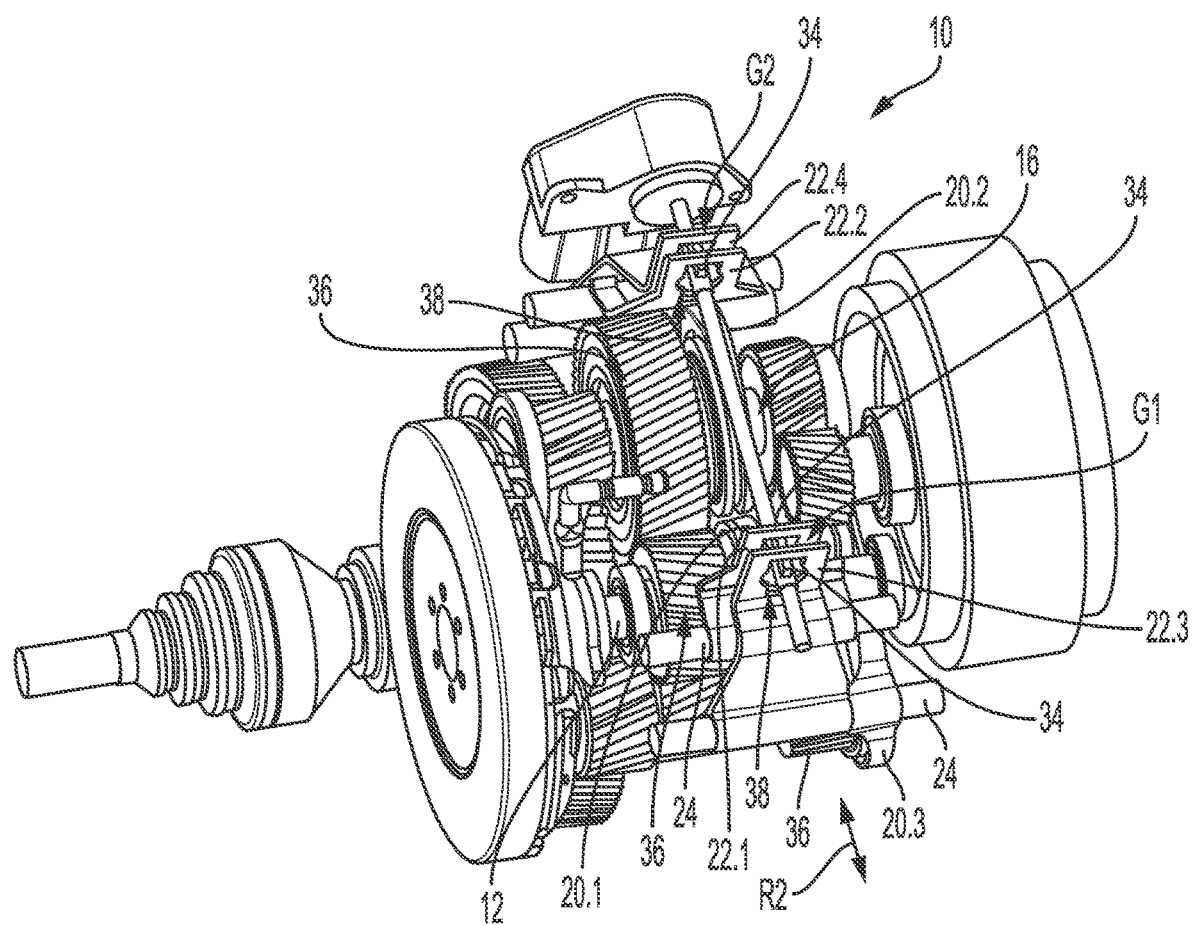
FIG. 2: shows another three-dimensional view of the manual transmission from FIG. 1.

In FIG. 2, a further three-dimensional view of the manual transmission 10 from FIG. 1 is shown. The drive shaft 12 is assigned a first idler gear 36 and a second idler gear, both of which can be actuated by a first transmission element 22.1 via a first gear shift unit 20.1. The first intermediate shaft 16 is assigned a further idler gear 36 which can be actuated via a second transmission element 22.2 by a second gear shift unit 20.2. The second intermediate shaft is assigned a further idler gear 36 which can be actuated via a third transmission element 22.3 via a third gear shift unit 20.3. The output shaft is assigned a further idler gear which can be actuated via a fourth transmission element 22.4.

Each transmission element 22 is received axially displaceably on its own guide rod 24. The gear shift elements 34 assigned to the first and third transmission elements 22.1, 22.3 form a first gear shift group G1 and the gear shift elements 34 assigned to the second and fourth transmission elements 22.2, 22.4 form a second gear shift group G2.

When the shifting coupling is set, the gear shift elements 34 can be coupled to the respective coupling means 38 of the transmission elements 22. The coupling means 38 are designed as a keyhole-shaped actuating contour in the respective transmission element 22. When the shift coupling is set, the gear shift elements 34 are arranged in an axially overlapping manner with respect to the respective transmission elements 22 in relation to the second axial direction R2.

Figure 3:
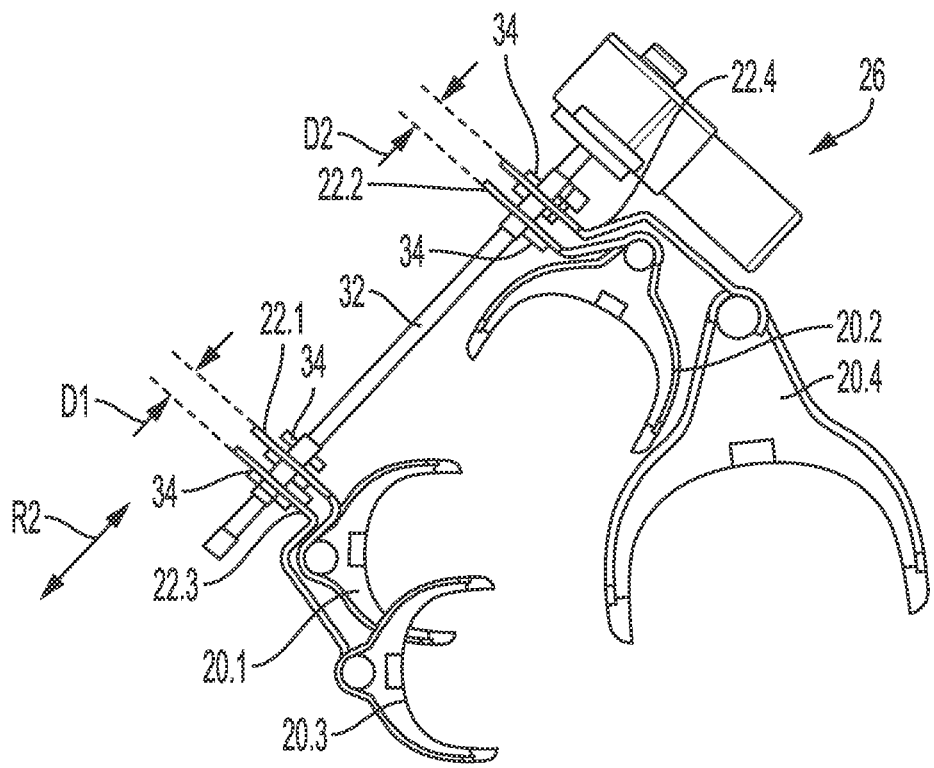
FIG. 3: shows a side view of an actuating device of the manual transmission from FIG. 1.

FIG. 3 shows a side view of an actuating device 26 of the manual transmission from FIG. 1. The transmission elements 22 are spaced apart from one another in the area of the actuating element 32 in relation to the second axial direction R2 and, when the shifting coupling is set, are arranged axially overlapping with respect to the respective gear shift elements 34 in relation to the second axial direction R2.

The gear shift unit 20, which is designed as a gear shift fork, is firmly connected to the assigned transmission element 22. The guide rods 24 are aligned parallel to one another and arranged at a distance from one another.

A first distance D1 with respect to the second axial direction R2 between the first and third transmission elements 22.1, 22.3 can be the same or different from a second distance D2 with respect to the second axial direction R2 between the second and fourth transmission elements 22.2, 22.4. The first and/or second distance D1, D2 can be greater than or equal to the single, the double, in particular the triple, preferably the quadruple, selecting step length.

Figure 4:
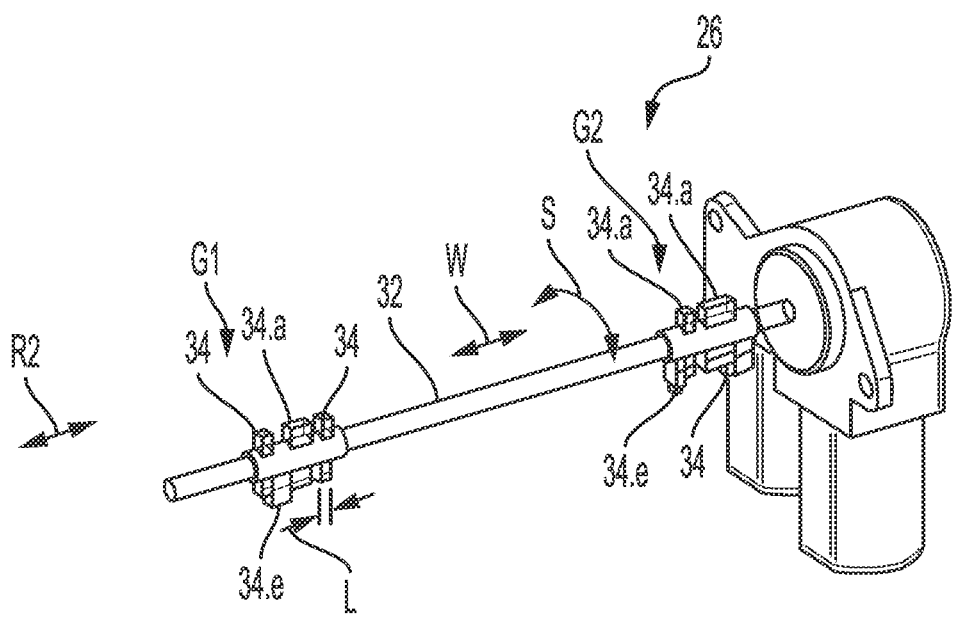
FIG. 4: shows a three-dimensional view of the actuating device from FIG. 3.

In FIG. 4 a three-dimensional view of the actuating device 26 from FIG. 3 is shown. The actuating element 32 is designed as an actuating shaft and is displaceable in the second axial direction R2 for the selecting movement W and rotatable about its longitudinal axis for the shifting movement S. The movement along the second axial direction R2 causes a selecting movement W for changing a selecting position of the actuating element 32 and the rotary movement a shifting movement for changing over the gear ratios. The selecting position can be changed in selecting steps that are separated from one another by a selecting step length.

The gear ratios can be engaged by at least one gear shift element 34 and the gear ratios can be designed by another gear shift element 34. The gear shift element 34 for engaging the gear ratios can be designed as an engagement finger 34e and the gear shift element 34 for disengaging the gear ratios can be designed as a disengagement finger 34a. The gear shift unit is brought into a neutral position when the assigned gear ratio is disengaged.

The first and second gear shift groups G1, G2 each have at least one engagement finger 34e and at least one disengagement finger 34a. Starting from the actuating element 32, the engagement fingers 34e are designed to be radially longer than the disengagement fingers 34a. If the disengagement fingers 34a are in a shifting coupling with the respective transmission elements, then the transmission steps assigned to these transmission elements are disengaged when the shifting movement is carried out. If the engagement fingers 34e are in a shifting coupling with the respective transmission elements, then the transmission steps assigned to these transmission elements are engaged when the shifting movement is carried out.

A gear shift length L along the second axial direction R2 of some of the gear shift elements 34 is preferably smaller than the selecting step length. However, two of the switching elements 34 of the first gear shift group G1 are longer than the two other gear shift elements 34 in relation to the second axial direction R2. In the second gear shift group G2, too, an engagement finger 34e and a disengagement finger 34a are longer than the other gear shift elements 34. In this way, a more versatile shifting of the gear ratios can be achieved. This is described in more detail using the following illustrations.

FIG. 5 shows a gear shift table of a manual transmission. The top line indicates the gear shift stages that are assigned to a respective transmission element, with the exception of the gear ratios A1, A2, which are both assigned to a common transmission element. The following six lines stand for the gear ratios engaged in each of the six gears, where x stands for an engaged gear ratio and 0 stands for a disengaged gear ratio.

The subsequent further lines show the shifting operations of the individual gear ratios to be carried out for a respective gear change, for example in the upper line for a gear change from a first gear to the second gear. An arrow pointing upwards stands for the disengagement of the gear ratio and an arrow pointing downwards stands for the engagement of the gear ratio. No specification means that the shift position of the gear ratio is retained.

In the example of a gear change from the first to the second gear, the gear ratio A1 is engaged via the gear shift movement of the actuating element and the gear shift elements, the gear ratio A2 is disengaged and the gear ratios B, C, X are retained unchanged. A gear change from the second to the third gear and from the fourth to the fifth gear and vice versa requires two selecting steps, corresponding to two selecting positions to be taken with each selected movement.

For example, when changing gear from second to third and from fourth to fifth gear, it is necessary to engage the gear ratio C and disengage all remaining gear ratios. When the gear ratio C is engaged when changing gear from sixth to fifth gear or from fourth to third gear, at least one engagement of one of the two gear ratios A1, A2 must be retained. This necessary variability is achieved as described below.

Figure 6:
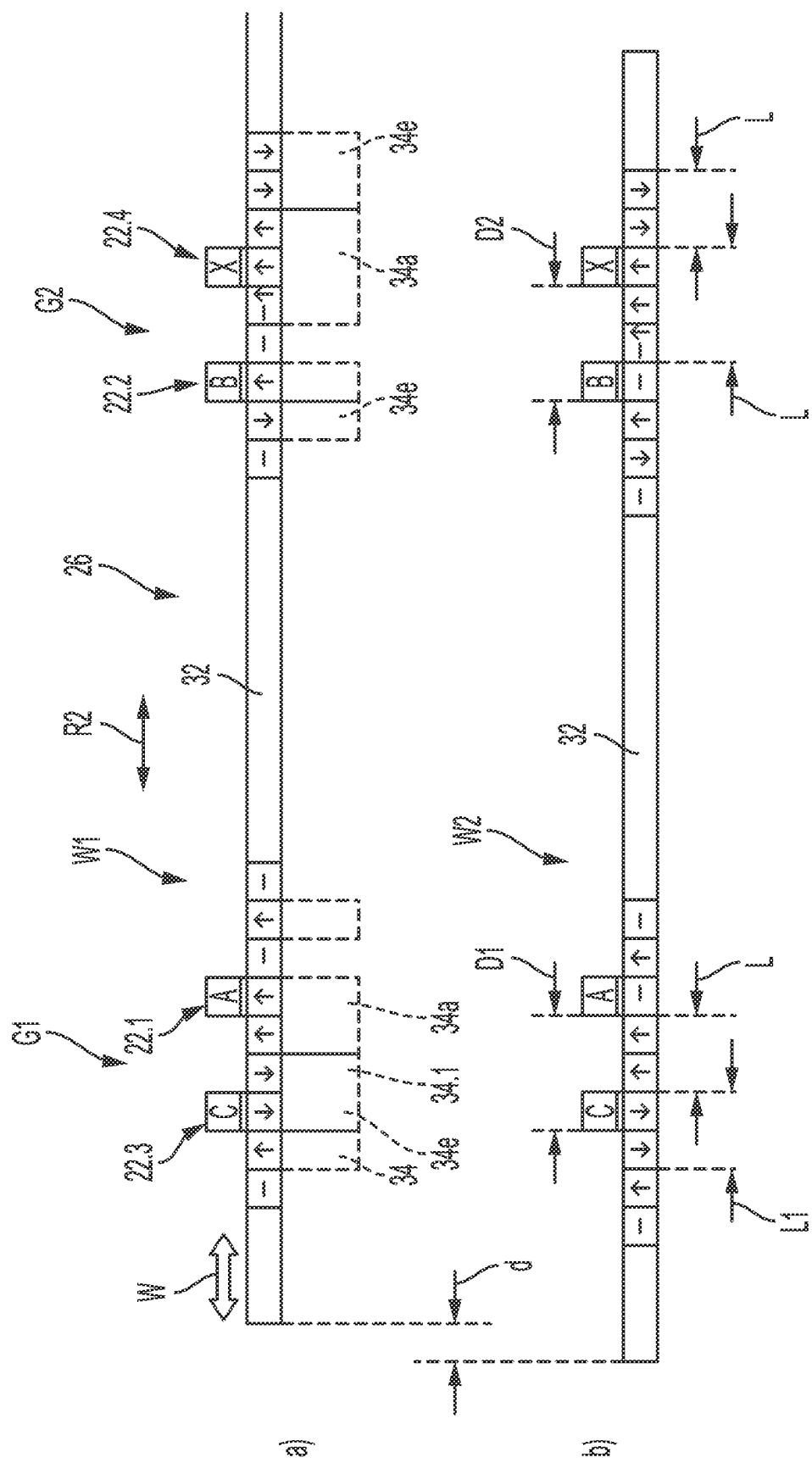
FIG. 6: shows a gear shift process of an actuating device.

FIG. 6 is a gear shift process of an actuating device 26. The actuating element 32 in FIG. 6a is in a first selecting position W1 for shifting coupling with the transmission elements 22 with the gear shift elements 34 shown in each case by executing a shifting movement via which the transmission elements are used to engage, disengage or maintain the switching position compared to the actuating element 32 shown in FIG. 6b, which is deflected by a selecting movement W along the second axial direction R2 by a selecting step length d offset to the second selecting position W2 and the shifting coupling between the gear shift elements 34 and the transmission elements 22 is offset by the selecting step length d.

For example, the first selecting position W1 shown in FIG. 6a and the shifting movement indicated by arrows represents a gear change from second to third gear, and the second selecting position W2 shown in FIG. 6b, offset by the selector step length d, with the shift movement shown represents a gear change from fourth to third gear. The first gear shift element 34.1, here an engagement finger 34e, of the first gear shift group G1 is in shifting coupling with the transmission element C in the immediately adjacent first and second selecting positions W1, W2. A shifting movement in the first and second selecting positions W1, W2 is effected via the first gear shift element 34.1 a deflection of the transmission element C, here to engage the assigned gear ratio.

The first gear shift element 34.1 has a first gear shift length L1 which is greater than the selecting step length d, preferably greater than or equal to twice the selecting step length d. This allows the gear shift to be carried out more independently and in a more versatile manner. In relation to the example, the transmission element C can be deflected and thereby the gear ratio assigned to the transmission element C can be engaged and either the transmission element A remains inactive or deflected, i.e., the gear ratio assigned to the transmission element A can be maintained or disengaged.

A gear shift element 34, embodied as a disengagement finger 34a, of the first gear shift group G1 also has a gear shift length L which is preferably greater than or equal to twice the selecting step length d. A gear shift element 34 assigned to the second gear shift group G2, here an engagement finger 34e, also has a gear shift length L which is preferably greater than or equal to twice the selecting step length d. The second gear shift group G2 also comprises a gear shift element 34, here a disengagement finger 34a, which has a gear shift length L which is greater than or equal to three times the selecting step length d. Two gear shift elements 34, here engagement fingers 34e, each for engaging at least one gear ratio are arranged in the second gear shift group G2.

A first distance D1 with respect to the second axial direction R2 between the first transmission element 22.1 and the third transmission element 22.3 can be the same or different from a second distance D2 with respect to the second axial direction R2 between the second transmission element 22.2 and the fourth transmission element 22.4. The first and/or second distance D1, D2 can be greater than or equal to twice, in particular three times, preferably four times, the selecting step length d. The distance is to be selected in such a way that the smallest possible number of selecting positions has to be taken in order to select the gears in the manual transmission. The selecting movement should be reduced as much as possible.

LIST OF REFERENCE SYMBOLS

10 Manual transmission
12 Driveshaft
14 Output shaft
16 Intermediate shaft
18 Gearwheel
20 Gear shift unit
22 Transmission element
24 Guide rod
26 Actuating device
28 Actuator device
30 Actuator element
32 Actuating element
34 Gear shift element
36 Idler gear
38 Coupling means
d Selecting step length
D1 First distance
D2 Second distance
G1 First gear shift group
G2 Second gear shift group
L Gear shift length
R1 First axial direction
R2 Second axial direction
S Shifting movement
W Selecting movement

The invention claimed is:

1. An actuating device for actuating gear ratio-changing gear shift units of a manual transmission, comprising:

a plurality of deflectable transmission elements assigned to a respective gear shift unit for changing a gear ratio, the plurality of deflectable transmission elements including a first transmission element, a second transmission element, a third transmission element, and a fourth transmission; and a movable actuating element having a plurality of gear shift elements assigned thereto, the gear shift elements movable together with the actuating element and which, dependent on a selected selecting position of the actuating element that is variable by a selecting movement of the actuating element, are coupled with coupling means of the transmission elements via a gear shift coupling for deflecting the transmission elements by means of a shifting movement of the actuating element;

wherein the shifting movement is independent of the selecting movement;

wherein the selecting position is changeable in selecting steps that are delimited by a selecting step length;

wherein the plurality of gear shift elements include a first gear shift element, a second gear shift element, a third gear shift element, and fourth gear shift element, the first and second gear shift elements being arranged in a first gear shift group, and the third and fourth gear shift elements being arranged in a second gear shift group;

wherein the first gear shift group engages only the first and third transmission elements, and the second gear shift group engages only the second and fourth transmission elements;

wherein the first and third gear shift elements each have a first interconnected gear shift length which effects the shifting coupling with one of the transmission elements in the corresponding gear shift group and which is greater than the selecting step length; and wherein the second and fourth gear shift elements each have a second interconnected gear shift length which is different from the first interconnected gear shift length.

2. The actuating device according to claim 1, wherein the first gear shift element is designed to engage or disengage at least one gear ratio.

3. The actuating device according to claim 1, wherein the first gear shift length is at least twice as large as the selecting step length.

4. The actuating device according to claim 1, wherein the first gear shift element has a shifting coupling with the first transmission element in a first selecting position and also in an adjacent second selecting position.

5. The actuating device according to claim 4, wherein a shifting movement in the first and second selecting positions causes a deflection of the first transmission element.

6. The actuating device according to claim 5, wherein the third transmission element is deflected in the first selecting position and not deflected in the second selecting position by the shifting movement.

7. The actuating device according to claim 1, wherein the second interconnected gear shift lengths is greater than the selecting step length.

8. A manual transmission having gear shift units and gear ratios which are selectable by an actuating device according to claim 1.

9. A transmission shift actuation device, comprising:

an actuating element independently movable in a selecting direction and a shifting direction, wherein a plurality of selection positions are defined in the selecting direction at intervals separated by a selecting step size;

a plurality of transmission elements configured to selectively couple gears to shafts in response to deflections to establish various transmission ratios, the plurality of transmission elements including a first transmission element, a second transmission element, a third transmission element, and a fourth transmission element; and a plurality of gear shift elements arranged on the actuating element, each gear shift element configured to selectively engage at least one of the transmission elements in at least one of the selection positions such that, in the at least one selection position, the transmission element is deflected in response to movement of the actuating element in the shifting direction;

wherein the plurality of gear shift elements include a first gear shift element and a second gear shift element arranged in a first gear shift group, and a third gear shift element and a fourth gear shift element arranged in a second gear shift group;

wherein the first gear shift group engages only the first and third transmission elements, and the second gear shift group engages only the second and fourth transmission elements;

wherein the first and third gear shift elements have an engagement length greater than the selecting step size, and the second and fourth gear shift elements have a further engagement length that is different from the engagement length.

10. The transmission shift actuation device of claim 9, wherein a different subset of the transmission elements is deflected in each selection position.

11. The transmission shift actuation device of claim 9, wherein the engagement length is greater than the selecting step size.

12. The transmission shift actuation device of claim 9, wherein the further engagement length is greater than the selecting step size.

13. The actuating device according to claim 1, wherein the first gear shift group includes a further gear shift element having a further interconnected gear shift length, wherein the further interconnected gear shift length is less than or equal to the selecting step length.

14. The actuating device according to claim 1, wherein the second interconnected gear shift length is less than the first interconnected gear shift length.

15. The actuating device according to claim 1, wherein the second transmission element is axially spaced from the first transmission element, the first transmission element is disposed axially between the second and third transmission elements, and the second transmission element is disposed axially between the first and fourth transmission elements.

16. The actuating device according to claim 1, wherein the gear shift unit is a gear shift fork.

17. The transmission shift actuation device of claim 9, wherein the first gear shift group includes a further gear shift element having another engagement length, wherein the other length is less than the selecting step size.

18. The transmission shift actuation device of claim 9, wherein the further engagement length is less than or equal to the engagement length.

19. The transmission shift actuation device of claim 9, wherein the second transmission element is axially spaced from the first transmission element, the first transmission element is disposed axially between the second and third transmission elements, and the second transmission element is disposed axially between the first and fourth transmission elements.

* * * * *